US007845016B2

(12) United States Patent
Diab et al.

(10) Patent No.: US 7,845,016 B2
(45) Date of Patent: *Nov. 30, 2010

(54) METHODS AND APPARATUS FOR VERIFYING MODULES FROM APPROVED VENDORS

(75) Inventors: Wael William Diab, San Francisco, CA (US); Anshul Sadana, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1097 days.

This patent is subject to a terminal disclaimer.

(21) Appl. No.: 11/287,783

(22) Filed: Nov. 28, 2005

(65) Prior Publication Data

US 2007/0124413 A1    May 31, 2007

(51) Int. Cl.
*G08B 29/00* (2006.01)
*H04L 9/32* (2006.01)
(52) U.S. Cl. ......................... 726/34; 713/176
(58) Field of Classification Search .................. 713/176; 726/34
See application file for complete search history.

(56) References Cited

U.S. PATENT DOCUMENTS

| 5,268,963 | A | * | 12/1993 | Monroe et al. ............... 713/186 |
| 5,434,870 | A | * | 7/1995 | Benton et al. ................ 714/752 |
| 5,781,723 | A | | 7/1998 | Yee et al. ....................... 726/20 |
| 5,933,503 | A | | 8/1999 | Schell et al. ................. 713/189 |
| 6,073,118 | A | | 6/2000 | Gormish et al. ............... 705/39 |
| 6,137,805 | A | * | 10/2000 | Berstis ........................ 370/428 |
| 6,192,420 | B1 | | 2/2001 | Tsai et al. ...................... 710/10 |
| 6,220,873 | B1 | | 4/2001 | Samela et al. .............. 439/76.1 |
| 6,285,990 | B1 | | 9/2001 | Lee et al. ....................... 705/60 |
| 6,484,128 | B1 | | 11/2002 | Sekiya et al. ................ 702/185 |
| 6,546,487 | B1 | | 4/2003 | McManis ..................... 713/169 |
| 6,571,335 | B1 | | 5/2003 | O'Donnell et al. .......... 713/173 |
| 6,615,350 | B1 | | 9/2003 | Schell et al. ................. 713/168 |
| 6,629,061 | B1 | * | 9/2003 | Shaffer ........................ 702/188 |
| 6,816,968 | B1 | * | 11/2004 | Walmsley .................... 713/168 |
| 7,234,061 | B1 | * | 6/2007 | Diab et al. ................... 713/176 |
| 7,272,728 | B2 | * | 9/2007 | Pierson et al. ............... 713/194 |
| 7,366,551 | B1 | * | 4/2008 | Hartley ..................... 455/575.1 |

(Continued)

OTHER PUBLICATIONS

Menezes, Alfred J., et al. Handbook of Applied Cryptography. CRC Press. Washington, DC, 1997. p. 363.

(Continued)

*Primary Examiner*—Michael Pyzocha
(74) *Attorney, Agent, or Firm*—BainwoodHuang

(57) ABSTRACT

A technique verifies a that a module is from an approved vendor. The technique involves obtaining vendor data and a first magic code from a module (e.g., a small form factor pluggable component), and generating a second magic code based on the vendor data. The technique further involves outputting (i) a magic code valid signal when the second magic code matches the first magic code, and (ii) a magic code invalid signal when the second magic code does not match the first magic code. Operation of a computerized device having the module can be based on the valid and invalid signals (e.g., a voltage level, a bit that is set or cleared, a value in a register, etc.). For example, a supplier of the electronic device can configure software running on the computerized device to disable the module if the first and second magic codes do not match.

21 Claims, 11 Drawing Sheets

U.S. PATENT DOCUMENTS

| | | | |
|---|---|---|---|
| 7,394,997 B2* | 7/2008 | Mei et al. | 399/12 |
| 7,502,942 B1* | 3/2009 | Mahmoud | 713/189 |
| 2003/0004887 A1* | 1/2003 | Roszak | 705/57 |
| 2003/0037239 A1 | 2/2003 | Leung et al. | 713/169 |
| 2003/0200149 A1* | 10/2003 | Gonzalez et al. | 705/26 |
| 2003/0236998 A1* | 12/2003 | Gilstrap et al. | 713/200 |
| 2004/0031030 A1 | 2/2004 | Kidder et al. | 717/172 |
| 2004/0044631 A1* | 3/2004 | Walker et al. | 705/59 |
| 2005/0073389 A1* | 4/2005 | Chandley | 340/5.31 |
| 2005/0114880 A1* | 5/2005 | Gould | 725/25 |
| 2005/0201380 A1* | 9/2005 | Saleh et al. | 370/395.2 |
| 2005/0278438 A1* | 12/2005 | Sandaire | 709/223 |
| 2006/0101517 A1* | 5/2006 | Banzhof et al. | 726/25 |
| 2006/0251253 A1* | 11/2006 | Kappler et al. | 380/255 |
| 2006/0265742 A1* | 11/2006 | Rommelmann et al. | 726/16 |
| 2007/0083916 A1* | 4/2007 | Coyle | 726/4 |

OTHER PUBLICATIONS

Computer Hope. Definition of "Serial Number." 1998-2006. www.computerhope.com/jargon/s/serinumb.htm.

* cited by examiner

148

| MODULE | MC OP. | SER. # | VENDOR | . . . |
|---|---|---|---|---|
| MOD1 | VALID | 0187444 | VENDOR1 | . . . |
| MOD2 | VALID | 0194761 | VENDOR2 | . . . |
| MOD3 | INVALID | 0183322 | VENDOR1 | . . . |
| ⋮ | ⋮ | ⋮ | ⋮ | |
| MODm | VALID | 0113997 | VENDORv | . . . |

| COMM. DEVICE | MODULE DATA |
|---|---|
| COMMDEV1 | MODDAT1 (1 - M1) |
| COMMDEV2 | MODDAT2 (1 - M2) |
| COMMDEV3 | MODDAT3 (1 - M3) |
| ⋮ | ⋮ |
| COMMDEVc | MODDATc (1 - Mc) |

METHODS AND APPARATUS FOR VERIFYING MODULES FROM APPROVED VENDORS

BACKGROUND

Some manufacturers provide electronic devices that use off-the-shelf third-party vendor components. Some electronic device manufacturers further offer to qualify such vendor components (e.g., test the vendor components under strict conditions) and, if the vendor components qualify, certify that the vendor components are from an "approved" vendor. An end customer who purchases an electronic device from an electronic device manufacturer and a component from an approved vendor typically receives an extra assurance from the electronic device manufacturer that the electronic device and the component will work normally when the component is properly installed and configured within the electronic device. On the other hand, an end customer who purchases an off the shelf component which is not from an approved vendor may receive no assurance from the electronic device manufacturer that the component will work properly within the device.

An example of a conventional electronic device, which is capable of using off the-shelf components from an approved vendor, is a data communications device that handles network traffic. Such a device can use off-the-shelf optical transceivers called Gigabit Interface Converters (GBICs) which are available from a variety of component vendors. Both off-the-shelf components from approved vendors as well as off-the-shelf components from non-approved vendors are available for this conventional electronic device. Other examples of such off-the-shelf components include Small Form Pluggable modules (SFPs and XFPs), modular optics packages known as XENPAKs, etc.

When an electronic device using components from a non-approved vendor fails, it can be difficult and expensive for the electronic device manufacturer to determine whether the failure is a result of a problem in the device itself or the components from the non-approved vendor. Accordingly, electronic device manufacturers often only agree to support device configurations which exclusively use components from an approved vendor. For device configurations that do not exclusively use components from an approved vendor, the electronic device manufacturer may not make any guarantees or may not provide any warrantees.

SUMMARY

Unfortunately, there are deficiencies to the above-described approach of simply supporting device configurations which use components from approved vendors and not supporting device configurations which use components from non-approved vendors. For example, a customer may claim that an electronic device does not operate properly and further claim that the device uses components from an approved vendor. In response, the electronic device manufacturer may send a technician to the customer site to determine the cause of the failure and to fix it. Unfortunately, when the technician visits the customer site, the technician may discover that the device actually uses non approved components (i.e., components from non approved vendors) which were purchased by the customer in order to reduce costs. At this point, it is difficult for the technician to leave without servicing the device (even though the device uses non approved components) since the customer has been waiting for service for some time. In particular, if the technician left without servicing the device, the electronic device manufacturer may lose customer goodwill and develop a poor service reputation. On the other hand, if the technician services the device, the only solution to make the device operate properly may be for the technician to now sell, install and configure a set of components from an approved vendor thus resulting in a disappointing and added expense for the customer. Accordingly, with the above-described approach, it is often difficult or impossible for the electronic device manufacturer deal with customers that use non-approved components in a manner that results in a positive outcome. That is, the electronic device manufacturer is often forced to endure (i.e., respond to) difficult customer calls resulting from the use of non-approved components. Often, the manufacturer may not find out that the customer is using non-approved components until it is too late.

Additionally, the electronic device manufacturer may desire the capability to control and track which vendors supply components for the manufacturer's electronic devices. For example, the manufacturer may be able to provide "approved vendor" licenses to vendors and thus develop partner relationships with particular vendors and/or derive a profit from selling such licenses.

In contrast to the above-described conventional approach in which it is difficult or impossible for an electronic device manufacturer to enforce or require customers to use only components from approved vendors, embodiments of the invention are directed to techniques for verifying that a module is from an approved vendor based on a code from the module. When the module is installed on an electronic device, the electronic device can generate a valid signal if the code is proper, or an invalid signal if the code is improper. Accordingly, device operation can be controlled based on whether the device uses or does not use modules from an approved vendor. For example, the electronic device can disable the module if the code is improper (i.e., if the electronic device determines that the module is not from an approved vendor).

Additionally, the disclosed methods and apparatus can be used to detect certain types of counterfeit modules that a non-approved vendor might produce, namely those in which the contents of a memory on the module containing various data are simply replicated from another module. For modules from approved vendors, the memory contents are unique to each module, for example by including a module serial number as well as vendor identification information, and thus the memory contents of any two modules from approved vendors generally do not match. The serial numbers from different modules can be compared to identify any duplicates, and if such duplicates are found it is an indication that the corresponding modules may not be from approved vendors. Serial number comparison can take place at multiple levels, such as within a single network communications device, or across multiple network communications devices connected to a common network, or across a potentially large number of network communications devices distributed across a wide area that have some form of communication with a central service provider. In the latter case, the role of the service provider is to collect module information, detect duplicate serial numbers indicating that modules may not be from approved vendors, and generate alert messages to the network communications devices when such duplicate serial numbers are found. As an example, the service provider may be the manufacturer of the network communications devices, and/or an approved manufacturer/vendor of the modules. In one embodiment, the communication between the network communications devices and the central service provider may take the form of a "call-in" feature by which the network communications devices initiate communications with the service provider to receive software updates and to report diagnostic and other information. The module information and alert messages can form part of the call-in communication.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a diagram showing the contents of a device module database from FIG. 8;

FIG. 10 is a diagram showing the contents of a network module database from FIG. 8;

DETAILED DESCRIPTION

Embodiments of the invention are directed to techniques for verifying that a module is from an approved vendor based on a code from the module. A valid signal results if the code is proper, and an invalid signal results if the code is improper. Accordingly, device operation can be controlled based on whether the device uses or does not use a vendor approved module.

Figure 1:
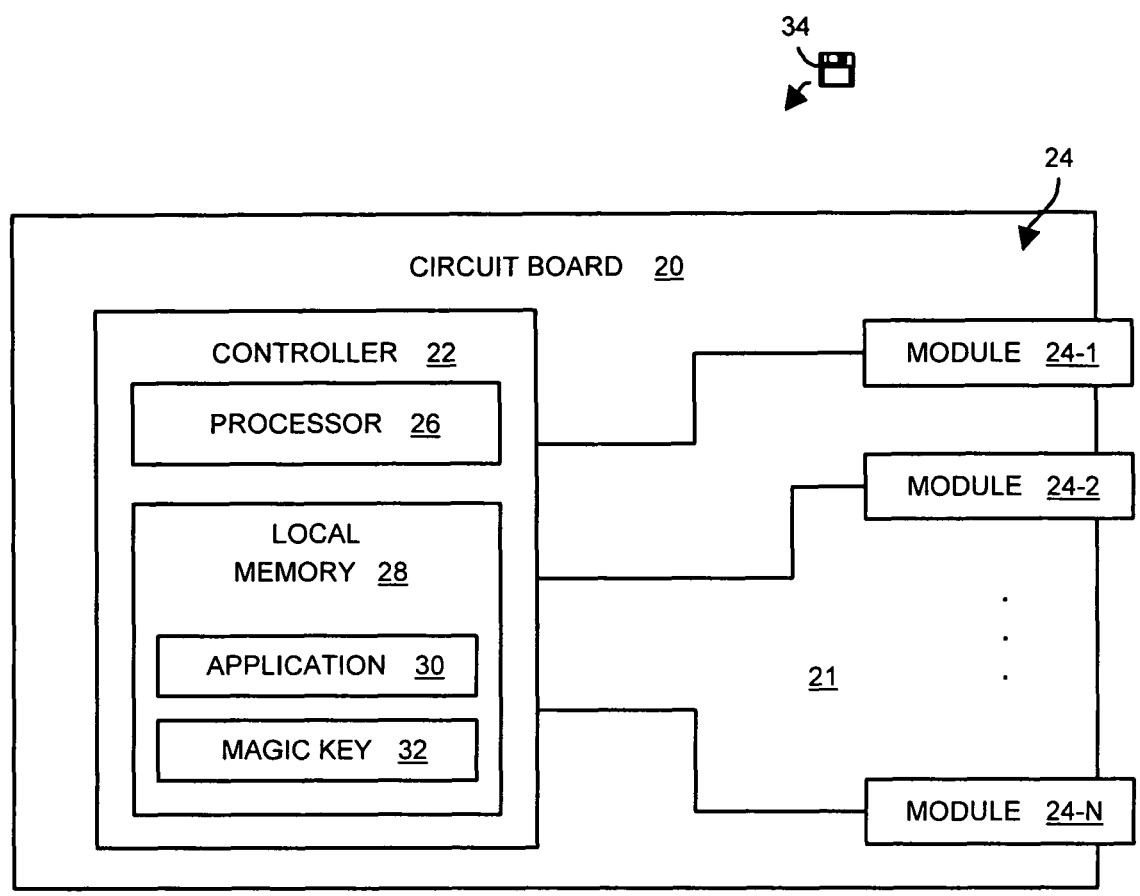
FIG. 1 shows a computerized device which is suitable for use by the invention.

FIG. 1 shows a circuit board 20 (a computerized device) which is suitable for use by the invention. The circuit board 20 includes a section of circuit board material 21, a controller 22 and a set of modules 24 1, . . . , 24-N (N being a positive integer). As shown, the modules 24-1, . . . , 24-N (collectively, the modules 24) connect with the controller 22 via circuit board connections (e.g., etch) of the circuit board material 21. The controller 22 includes a processor 26 and memory 28 which is preferably local to the processor 26. The memory 28 stores, among other things, an application 30 and a magic key 32.

The application 30 can be provided to the circuit board 20 from a computer program product 34. Suitable media for the computer program product 34 include one or more diskettes, tapes, CD-ROMs, network downloads, propagated signals, disk drives, combinations thereof, and the like.

Figure 2:
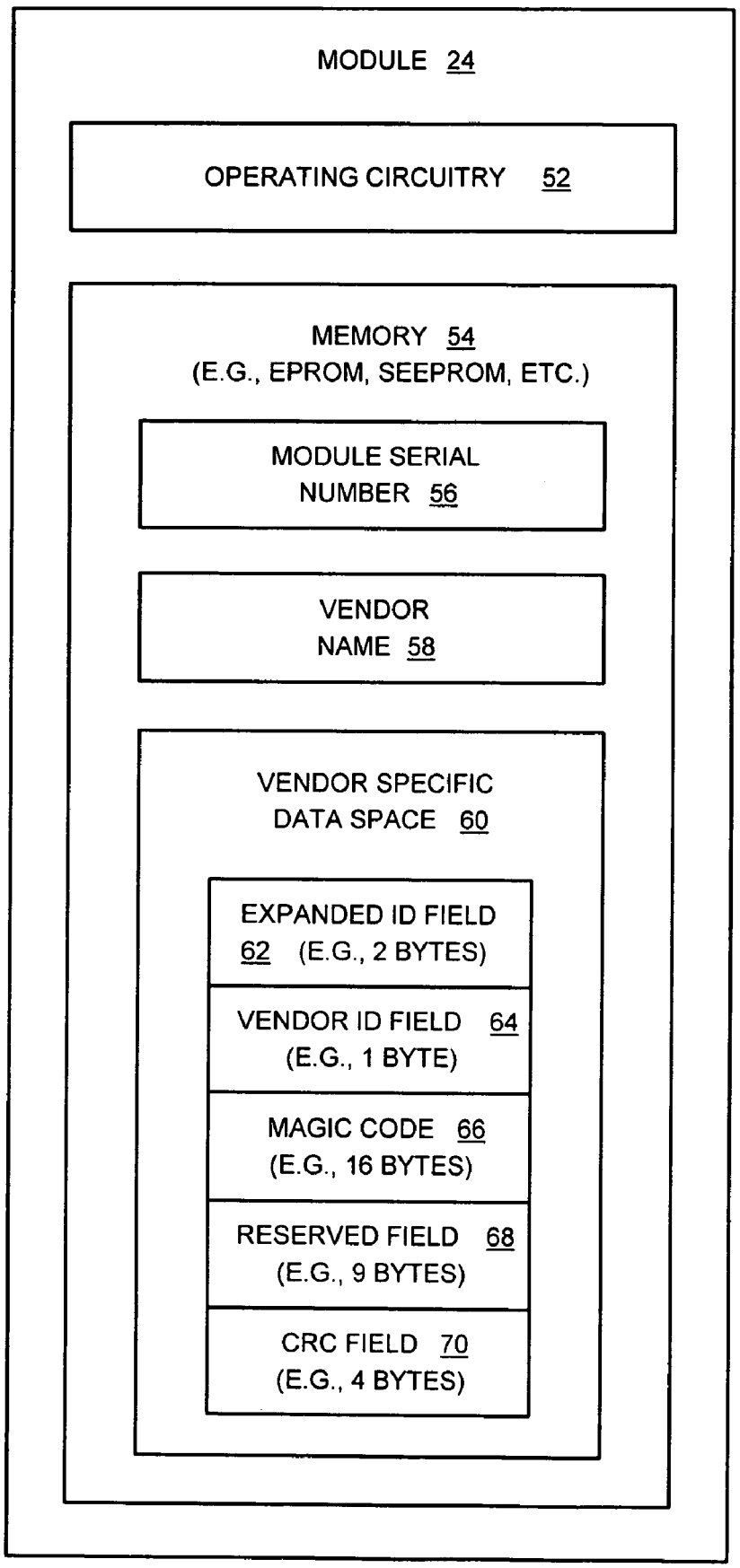
FIG. 2 shows a module which is an electronic component that is suitable for use by the computerized device of FIG. 1.

FIG. 2 shows details of a module 24. The module 24 includes operating circuitry 52 (e.g., data formatting circuitry, a transducer that converts between an electrical signal and a fiber optic signal, etc.) and memory 54 (e.g., a serial PROM). In one arrangement, the memory 54 is programmed by the vendor and is used, at least partly, for vendor identification purposes. The memory 54 includes a module serial number field 56, a vendor name field 58, and a vendor specific data space 60. The vendor specific data space 60 includes an expanded ID field 62, a vendor ID field 64, a magic code field 66, a reserved field 68 and a CRC field 70. The expanded ID field 62 and the reserved field 68 are reserved for future use.

An approved vendor programs the memory 54 (i.e., stores data in the memory 54 in a non-volatile manner) prior to shipping. In particular, the approved vendor stores a unique serial number into the module serial number field 56. The approved vendor stores a character string that identifies the approved vendor by name in the vendor name field 58. The approved vendor stores a vendor number that identifies the approved vendor in the vendor ID field 64. The approved vendor stores a magic code in the magic code field 66. In the CRC field 70 (or checksum field), the approved vendor stores an error checking value (e.g., an error detection value, an error correction value, etc.) for error checking the contents of the memory 54. The expanded ID field 62 and the reserved field 68 are reserved for future use (e.g., to identify specific mechanical interfaces, versions, etc.). In one arrangement, the expanded ID field 62 and the reserved field 68 are set blank (e.g., set to zero), and the vendor name field 58 is blank padded and null terminated.

It should be understood that, in a circuit board 20 that exclusively uses modules 24 from an approved vendor, there are no two modules 24 with the same serial number since the module serial number field 56 of each module 24 is supposed to hold a unique value. Accordingly, if the circuit board 20 detects multiple modules 24 with the same serial number, it is likely that the circuit board 20 includes modules 24 having a memory 54 which has been copied (or cloned) from another module 24, i.e., modules 24 from a non-approved vendor.

Before an approved vendor programs the memories 54 of the modules 24, the supplier of the circuit board 20 (e.g., the circuit board manufacturer) provides (i) a unique vendor number, (ii) a range of available and unique serial numbers, and (iii) a magic key 32 (also see FIG. 1) to that approved vendor. Then, for each module 24, the approved vendor performs a magic code operation to generate a magic code which goes into the magic code field 66 of that module 24. In particular, for each module 24, the approved vendor forms a magic code based on the vendor number, a character string identifying the vendor, a unique serial number (from the provided serial number range) for that module 24 and the magic key 32. The operation for forming the magic code can be represented as follows:

magic code=magic_code_op (vendor ID, vendor name, serial number, magic key).

The approved vendor then stores the module serial number, the character string and remaining vendor specific data in the memory 54 as described above. Preferably, the approved vendor does not store the magic key 32 in the memory 54 but keeps the magic key 32 proprietary so that only the approved vendor and the circuit board supplier know of its value.

In some arrangements, the circuit board 20 forms at least a portion of a data communications device. In these arrangement, the processor 26, when operating in accordance with the application 30, performs data communications operations (e.g., routing operations, switching operations, etc.). Furthermore, in these arrangements, the set of modules 24 are network interface devices such as fiber optic transceivers. For example, the set of modules 24 can be Giga-bit Interface Converters (GBICs). A suitable network interface device is described in a publication entitled "PRELIMINARY Product Specification Long-Wavelength Pluggable SFP Transceiver FTRJ-1319-3," by Finisar Corporation of Sunnyvale, Calif., Rev. B, Jul. 7, 2000, the teachings of which are hereby incorporated by reference in their entirety. Another suitable network interface device is described in a publication entitled "Gigabit Ethernet/Fiber Channel Small Form Factor Hot-Pluggable Transceiver," by IBM Corp of Armonk, N.Y., Aug. 15, 2000, the teachings of which are hereby incorporated by reference in their entirety. Details of a Small Form Factor Hot Pluggable Transceiver are described in a publication entitled "Cooperation Agreement for Small Form-Factor Pluggable Transceivers," posted at http://www.schelto.com/SFP/index.html, and dated Sep. 14, 2000, the teachings of which are hereby incorporated by reference in their entirety.

Figure 3:
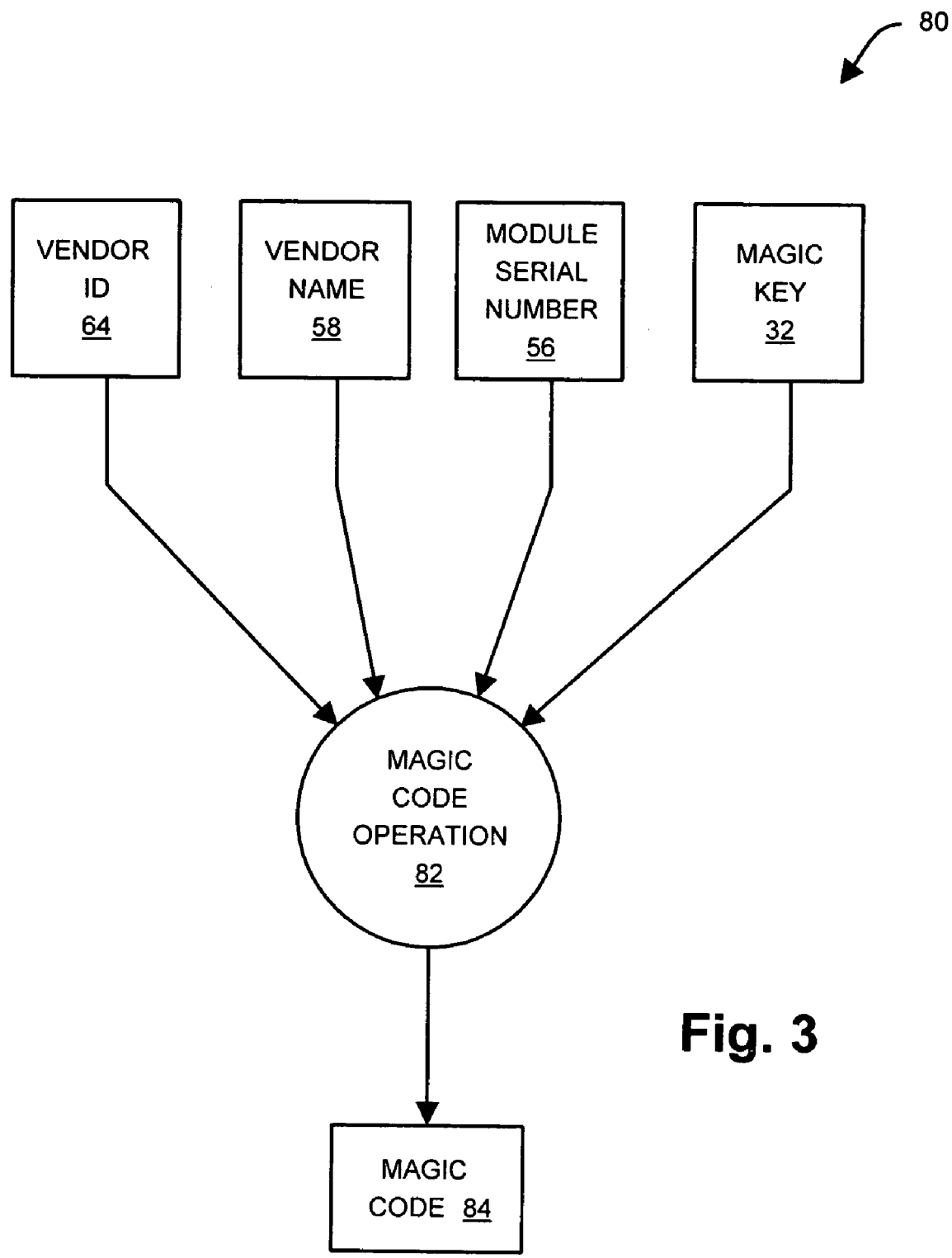
FIG. 3 shows a block diagram of an operation performed by the computerized device of FIG. 1 to generate a magic code.

FIG. 3 shows a view 80 of how a magic code operation 82 works to generate a magic code. The magic code operation 82 is based on the contents of the vendor ID 64, the vendor name 58, the module serial number 56 and the magic key 32. These values are processed by the magic code operation 82 to generate a magic code 84 (e.g., by the processor 26 running the application 30, see FIG. 1). In one arrangement, the magic code operation 82 involves the application of a message-digest algorithm (e.g., MD2, MD4, MD5, etc.). In another arrangement, the magic code operation 82 involves exclusive-OR (XOR) operations. In another arrangement, the magic code operation 82 involves the application of a different algorithm (e.g., a different encryption algorithm, an error checking algorithm, a proprietary polynomial algorithm, combinations thereof, etc.). As a result, the magic code 84 is preferably a code (e.g., 16 bytes) which is difficult to generate without the magic key 32 for high security.

As mentioned earlier, when a circuit board supplier authorizes an approved vendor to provide vendor-approved modules 24, the supplier provides the vendor with the magic key 32. The vendor can then generate and store magic codes 84 in the memories 54 of the modules 24 (e.g., EEPROM, Serial EEPROM, etc.) by performing the magic code operation 82 (see FIG. 3). The supplier programs the circuit board 20 with the same magic key 32 (see FIG. 1) so that later, when the circuit board 20 is in operation (e.g., in the field), the controller 22 of the circuit board 20 can read vendor data and the magic codes 84 (from the magic code fields 66) from the modules 24 to confirm that the modules 24 are from an authorized vendor. If the controller 22 determines that the modules 24 are not from an authorized vendor, the controller 22 shuts the modules 24 down (e.g., disables them, turns them off, etc.). Accordingly, the customer will not be able to use modules 24 which are not from an approved vendor, and will be unlikely to later call the circuit board supplier to complain that the circuit board 20 has worked for some time and suddenly and unexpectedly failed. Rather, upon installation of modules from a non-approved vendor, the customer will immediately realize that it cannot use the modules since the modules will be disabled.

Figure 4:
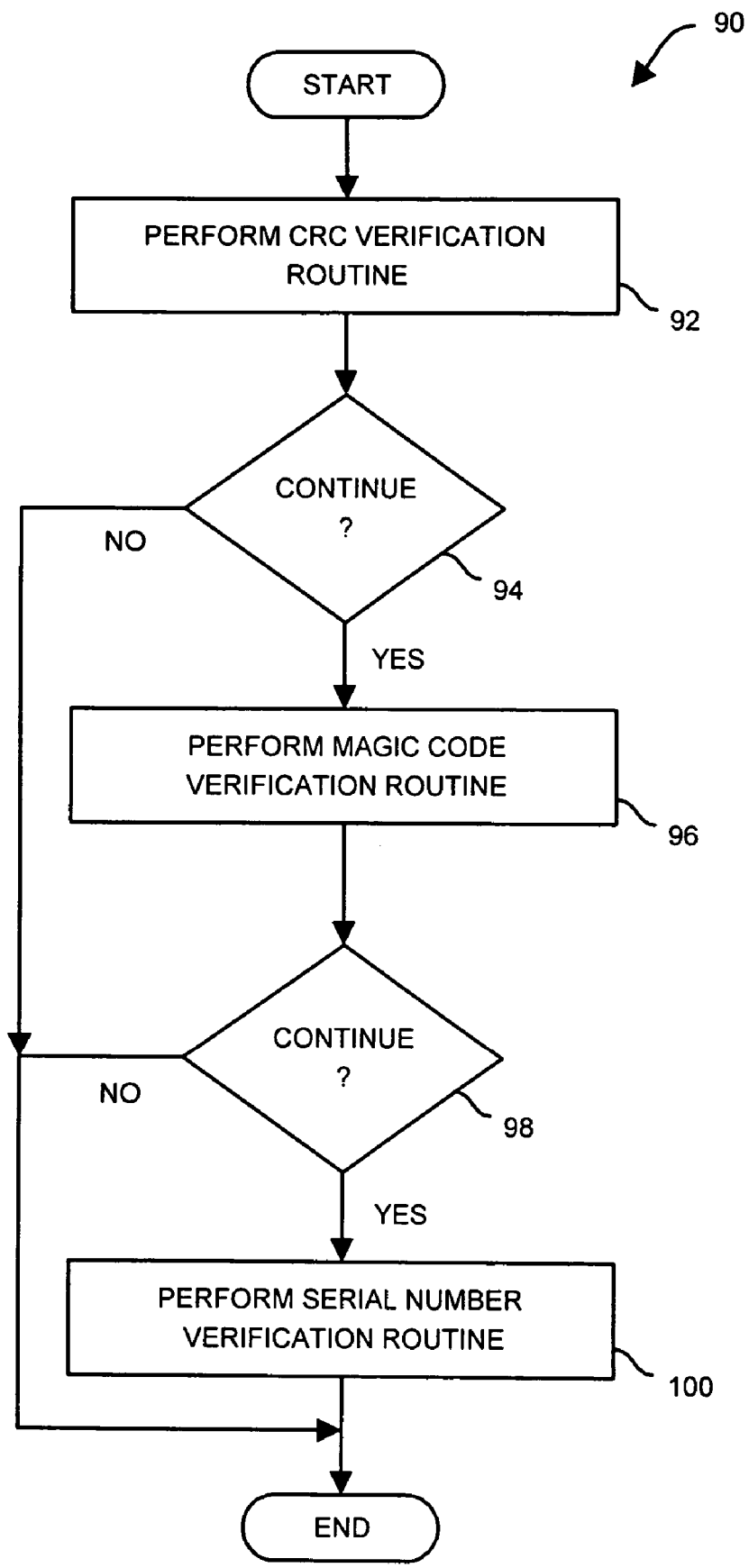
FIG. 4 is a flowchart of a procedure which is performed by the computerized device of FIG. 1.

FIG. 4 shows a flowchart of a procedure 90 which is performed by the controller 22 (i.e., the processor 26 operating in accordance with the application 30). In one arrangement, the controller 22 performs the procedure 90 in response to a power up of the device (e.g., the circuit board 20), or in response to a hot swap of a module 24 or a line card.

In step 92, the controller 22 performs a CRC verification routine on the modules 24. In particular, the controller 22 shuts down any modules 24 that have an incorrect CRC value in the CRC field 70 (see FIG. 2).

In step 94, if at least one of the modules 24 remains enabled, the controller 22 proceeds to step 96. Otherwise, the controller 22 terminates the procedure 90.

In step 96, the controller 22 performs a magic code verification routine on the modules 24. In particular, the controller 22 shuts down any modules 24 that have an incorrect magic code 84 in the magic code field 66 (FIG. 2). Accordingly, the controller 22 can screen out modules from non-approved vendors. The controller 22 then proceeds to step 98.

In step 98, if at least one of the modules 24 passes the magic code verification routine, the controller 22 proceeds to step 100. Otherwise, the controller 22 terminates the procedure 90.

In step 100, the controller 22 performs a serial number verification routine on the modules 24. In particular, the controller 22 shuts down any modules 24 that have the same serial number in the module serial number field 56. Accordingly, the controller 22 can screen out clones of a vendor approved module. The controller 22 then terminates the procedure 90.

The screening of CRC codes during step 92 enables the controller 22 to detect faulty modules 24 or modules with tampered memories 54. In particular, checking of the CRC codes ensures read operation integrity and data integrity (as well as provides security). The screening of magic codes 84 during step 96 enables the controller 22 to detect any non-authorized modules 24 based on magic codes 84 (e.g., knock-off components by unauthorized vendors). The screening of serial numbers during step 100 enables the controller 22 to identify modules 24 that improperly include the same serial number. Accordingly, the controller 22 can detect knockoff modules 24 having copies of a memory 54 from a vendor-authorized module 24.

Figure 5:
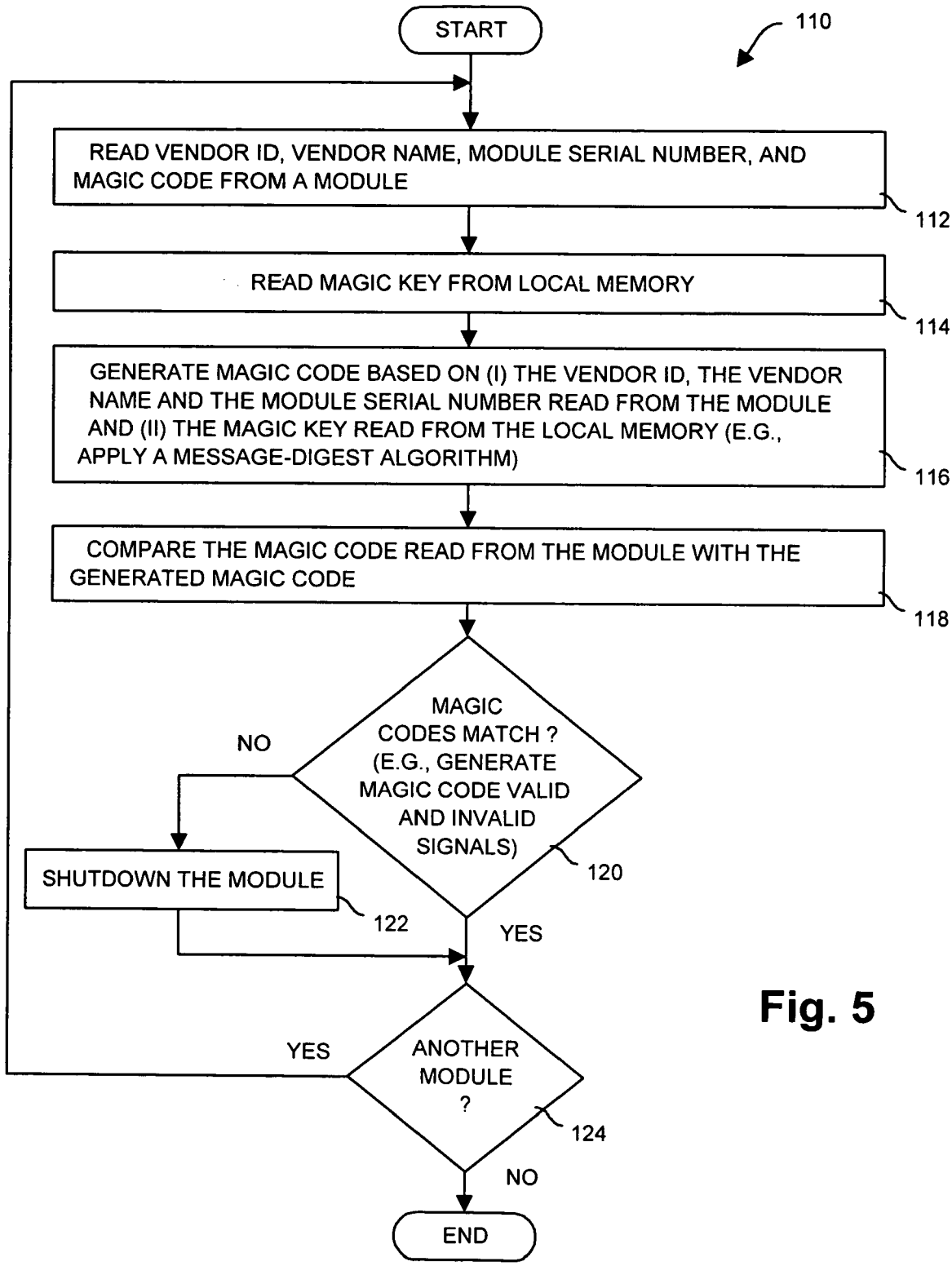
FIG. 5 is a flowchart of a step of the procedure of FIG. 4 for performing a magic code verification routine.

FIG. 5 shows a flowchart of a procedure 110 which is performed by the controller 22 which is suitable for step 96 of FIG. 4. In step 112, the controller 22 reads vendor data (e.g., contents from the vendor ID field 64, the reserved field 68 and the CRC field 70 of the memory 54, see FIG. 2), and a magic code (e.g., from the magic code field 66) from a module 24.

In step 114, the controller 22 reads a magic key 32 from the local memory 28.

In step 116, the controller 22 generates a magic code 84 based on the vendor data and the magic key 32. In one arrangement, the controller 22 applies an algorithm (e.g., MD5, XOR operations, etc.).

In step 118, the controller 22 compares the generated magic code with the magic code read from the module 24.

In step 120, if the magic codes match, the controller 22 proceeds to step 124. In particular, the controller 22 outputs a magic code valid signal (e.g., a first voltage level, a first binary code, etc.). If the magic codes do not match, the controller 22 proceeds to step 122. That is, the controller outputs a magic code invalid signal (e.g., a second voltage level, a second binary code, etc.).

In step 122, the controller 22 shuts down the module 24 because the module 24 is unauthorized (or faulty). In particular, the controller 22 disables the module 24 or treats the module 24 as being unavailable in response to the magic code invalid signal.

In step 124, the controller 22 repeats steps 112 through 122 if there are more modules 24 to test. Otherwise, the controller 22 terminates the procedure 110. Accordingly, the controller 22 shuts down any modules 24 which do not have complying magic codes (e.g., modules 24 from an unauthorized vendor).

Figure 6:
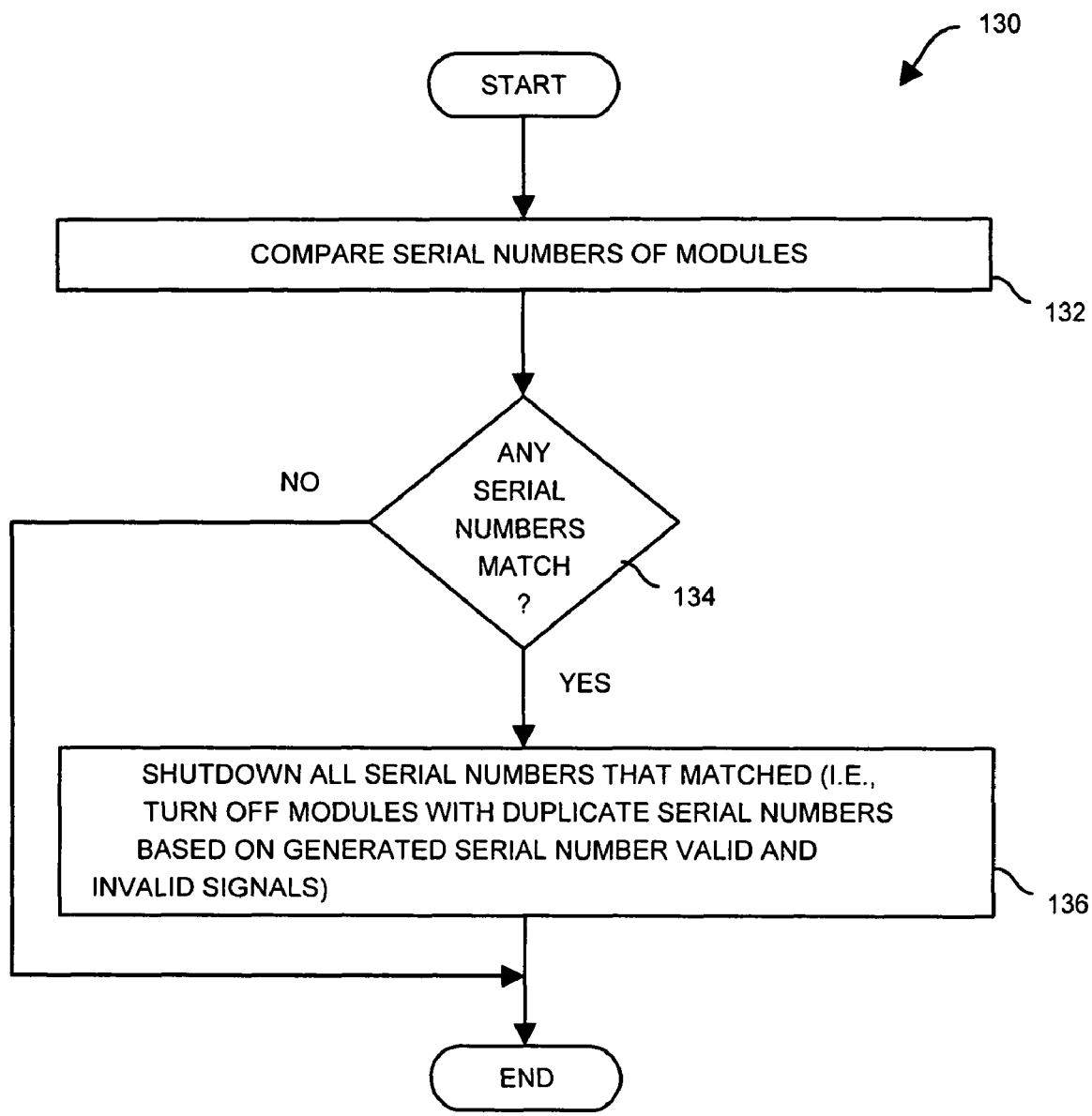
FIG. 6 is a flowchart of another step of the procedure of FIG. 4 for performing a serial number verification routine.

FIG. 6 shows a flowchart of a procedure 130 performed by the controller 22 which is suitable for step 100 of FIG. 4. In step 132, the controller 22 compares the serial numbers of the modules 24.

In step 134, the controller 22 determines whether any of the serial numbers match. In particular, the controller 22 provides serial number valid signals (e.g., first binary values) for modules 24 that have unique serial numbers, and serial number invalid signals (e.g., second binary values) for modules 24 having the same serial numbers.

In step 136, the controller 22 shuts down any modules 24 which have matching serial numbers. In particular, the controller 22 disables any modules 24 that resulted in a serial number invalid signal. Accordingly, the controller 22 shuts down any modules 24 which are copies (e.g., clones of a vendor-authorized module).

It will be appreciated that the process of FIG. 6 is limited to detecting duplicate module serial numbers within a single network communications device, such as a single switch or router. There may be scenarios in which different network communications devices have counterfeit modules 24 having duplicate serial numbers, but no more than one such module is used in a given device. In such a case, the counterfeit modules 24 will go undetected. It would be desirable to detect such patterns of use of counterfeit modules.

Figure 7:
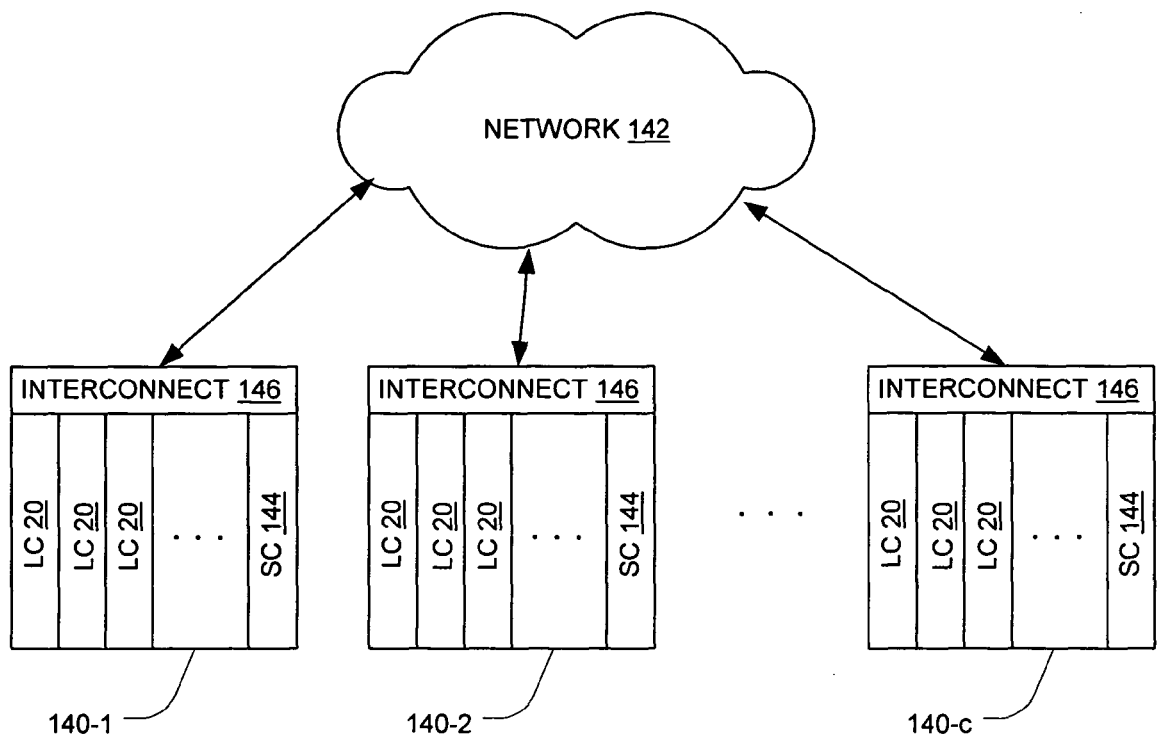
FIG. 7 is a block diagram of a system of networked communications devices.

FIG. 7 shows a system in which several network communications devices 140 (e.g. 140-1, 140-2 etc.) are interconnected by a network 142. The network communications devices 140 may be switches, routers, etc., and are also referred to in the following description as simply "devices" 140. As shown, each device 140 includes a plurality of the circuit boards 20 of the type shown in FIG. 1, each designated in FIG. 7 as a "line card" or LC 20. Each device 140 also includes a "supervisory card" or SC 144, and interconnect 146 that provides connections among the LCs 20 and the SC 144. The system of FIG. 7 may be a large enterprise or Internet service provider (ISP) system, for example, and the network 142 may be utilized for so-called Operations, Administration and Maintenance (OAM) functions of the system.

In a system such as shown in FIG. 7 having multiple interconnected devices 140, there is an opportunity to expand the detection of duplicate (matching) serial numbers beyond the process of FIG. 6, which as noted above is limited to detecting duplicate modules within a single communications device. Generally, it is possible to communicate module serial numbers among the devices 140 such that module serial numbers from different devices 140 can be compared. Modules 24 having matching serial numbers can be identified, even if located in different devices 140, and appropriate action can be taken based on the inference that the modules are from unapproved vendors.

Figure 8:
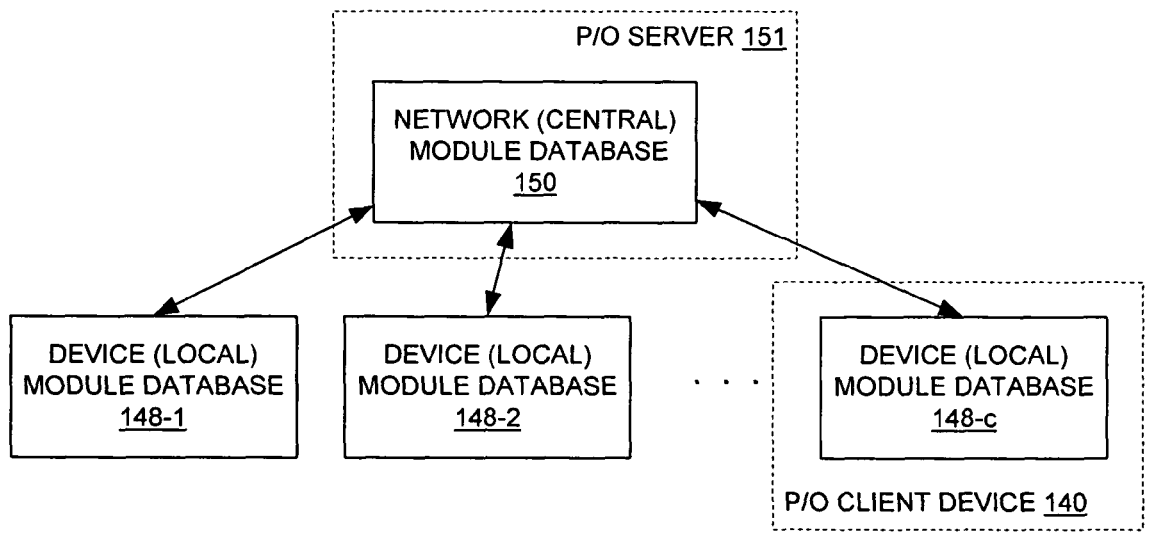
FIG. 8 is a block diagram depicting a set of module databases that may be used n a network of communications devices such as in FIG. 7.

FIG. 8 illustrates a configuration of databases that can be used within the system of FIG. 7 to facilitate the detection of duplicate serial numbers. A client-server model is shown, with a network (or central) module database 150 being maintained by a server 151 within the network 142 and a plurality of device (or local) module databases 148 maintained by respective devices 140 (148-1 in device 140-1, 148-2 in device 140-2, etc.) which have the role of "clients". Each device 140 maintains information obtained from all its modules 24 (e.g., contents of module memory 54) in its device module database 148. Additionally, each device 140 can optionally include status and other operational information about its modules 24, including the results of the magic code operation 82 for each module 24.

Each device module database 148 is communicatively coupled to the network module database 150, whose role is to maintain information about all the modules 24 within devices 140 attached to the network 142. The server 151 maintaining the network module database 150 may be a dedicated computerized device within the network 142, or it may be one of the devices 140 that has been selected by some manual or automatic process to function as the server 151. Techniques for automatically selecting one of a plurality of peers to perform a unique role are generally known in the art and are not elaborated further herein.

FIG. 9 shows an example of a device module database 148. Generally, the device module database 148 of each device 140 includes a record 152 (152-1, 152-2 etc.) for each module 24 in the device 140. Within each record 152, the corresponding module 24 is identified by a device-specific module identifier 154, which may be for example an identifier of a physical location of the module 24 within the device 140. Example module identifiers are shown as MOD1, MOD2, . . . , MODm. Each record 152 also includes an indicator 156 of the result of the magic code operation 82, a module serial number 158, a vendor identifier 160 (examples VENDOR1, VENDOR2, . . . , VENDORv shown), and additional data 162, some or all of which may have been obtained from the memory 54 of the corresponding module 24. Each device 140 populates the device module database 148 with the information for all modules 24 within the device 140, and updates the device module database 148 as modules 24 are added, removed or replaced. The contents of the device module database 148 are also used in a process of detecting duplicate modules 24 on different communications devices 140 as described below.

FIG. 10 shows an example of the network module database 150. Generally, it contains a record 164 (164-1, 164-2 etc.) for each communications device 140 within the network 142. Each record 164 includes an identifier 166 of the corresponding network communications device 140 (e.g., COMMDEV1, COMMDEV2, etc. as shown), and module data 168 for the identified network communications device 140 (e.g., MODDAT1, MODDAT2, etc.). Thus if there are "M1" modules 24 in device 140-1, there is an array of corresponding module data MODDAT1(1), MODDAT1(2), . . . , MODDAT1(M1) within the module data 168-1 for device 140-1. For each module 24, the data included in the module data 168 may include all the corresponding data from the corresponding record 152 of the device module database 148 of the device 140 on which the module 24 resides. More or less data may also be included. For purposes of the duplicate module detection process described below, it is assumed that at least the module serial number 56 (FIG. 2) is included.

Figure 11:
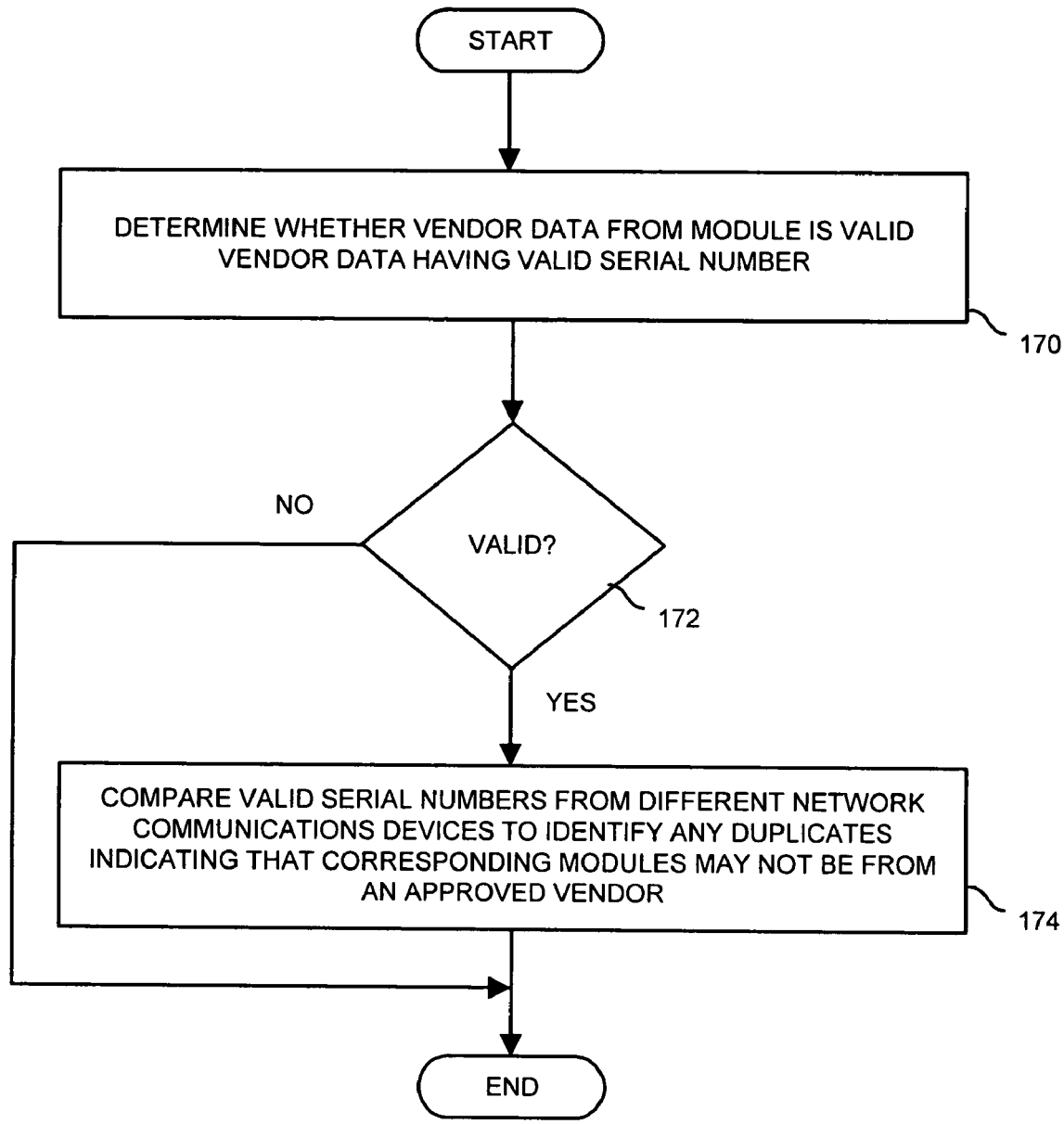
FIG. 11 is a flow diagram of a process for comparing module serial numbers from different communications devices in the system of FIG. 7.

FIG. 11 shows a process for detecting duplicate module serial numbers 56 among different communications devices 140 that employ the module databases 148 and 150 as shown in FIGS. 8-10. In step 170, it is determined whether vendor data obtained from a module 24 is valid vendor data having a valid module serial number. In this context, "valid" refers to the result of the above-described magic code operation 82, i.e., that the magic code calculated from the vendor data in the memory 54 of the module 24 matches the magic code 66 stored in the memory 54. In step 172, further operation depends on whether the vendor data is valid (Valid=Yes) or invalid (Valid=No). If the vendor data is invalid, then the process terminates immediately, as no further comparing would yield valid results given the invalidity of the vendor data. If the vendor data is valid, then the process proceeds to step 174.

In step 174, the now validated serial numbers of respective modules 24 from different network communications devices 140 are compared with each other to identify any duplicates (i.e., matching serial numbers from different modules 24 of different network communications devices 140). Duplication of valid serial numbers is an indication that the corresponding modules 24 may not be from an approved vendor, for the reasons discussed above—non-approved vendors may simply copy the entire memory 54 when manufacturing a knockoff module, in which case the module serial number (which is normally unique to one module 24) will be duplicated across many modules. Thus, the process of FIG. 11 can detect the presence of duplicate module serial numbers across multiple devices 140, in contrast to the process of FIG. 6 which is limited to the detection of duplicate serial numbers within a single device 140.

There may be a variety of ways that the serial number comparison 174 of FIG. 11 can be implemented. When a distributed database configuration such as that of FIG. 8 is utilized, it may be most convenient for the comparison to be done within the server 151 that maintains the network module database 150, because all the information required for such comparisons is present within such a server 151. Alternatively, the comparison may be done within each device 140 if there is some mechanism by which each device 140 receives the module serial numbers of other devices 140. This could be effected in a configuration like that of FIG. 8 by regularly distributing the contents of the network module database 150 to all the devices 140. Alternatively, it may be possible for a set of devices 140 to communicate among themselves in some distributed fashion to exchange module serial numbers, in which case there may be no need for the network module database 150. In a general sense, the comparison is done by some system component attached to or residing in the network 142, examples of which include a server such as server 151 or a service provider such as described below. In the following description, it is assumed that a database configuration like that shown in FIG. 8 is employed, and that the serial number comparisons are performed by the server 151 that maintains a network module database 150.

It will be appreciated that steps 170 and 172 of the process of FIG. 11 mirror the steps 112-120 of the process of FIG. 5. In some embodiments, it may be beneficial to fully or partially integrate the processes of FIGS. 5 and 11 into one overall process. In any event, if the validation steps 170 and 172 are performed within each network communications device 140 and the comparison step 174 is performed at a separate server 151, then the validated serial numbers from each network communications device 140 must be communicated to the server 151.

Figure 12:
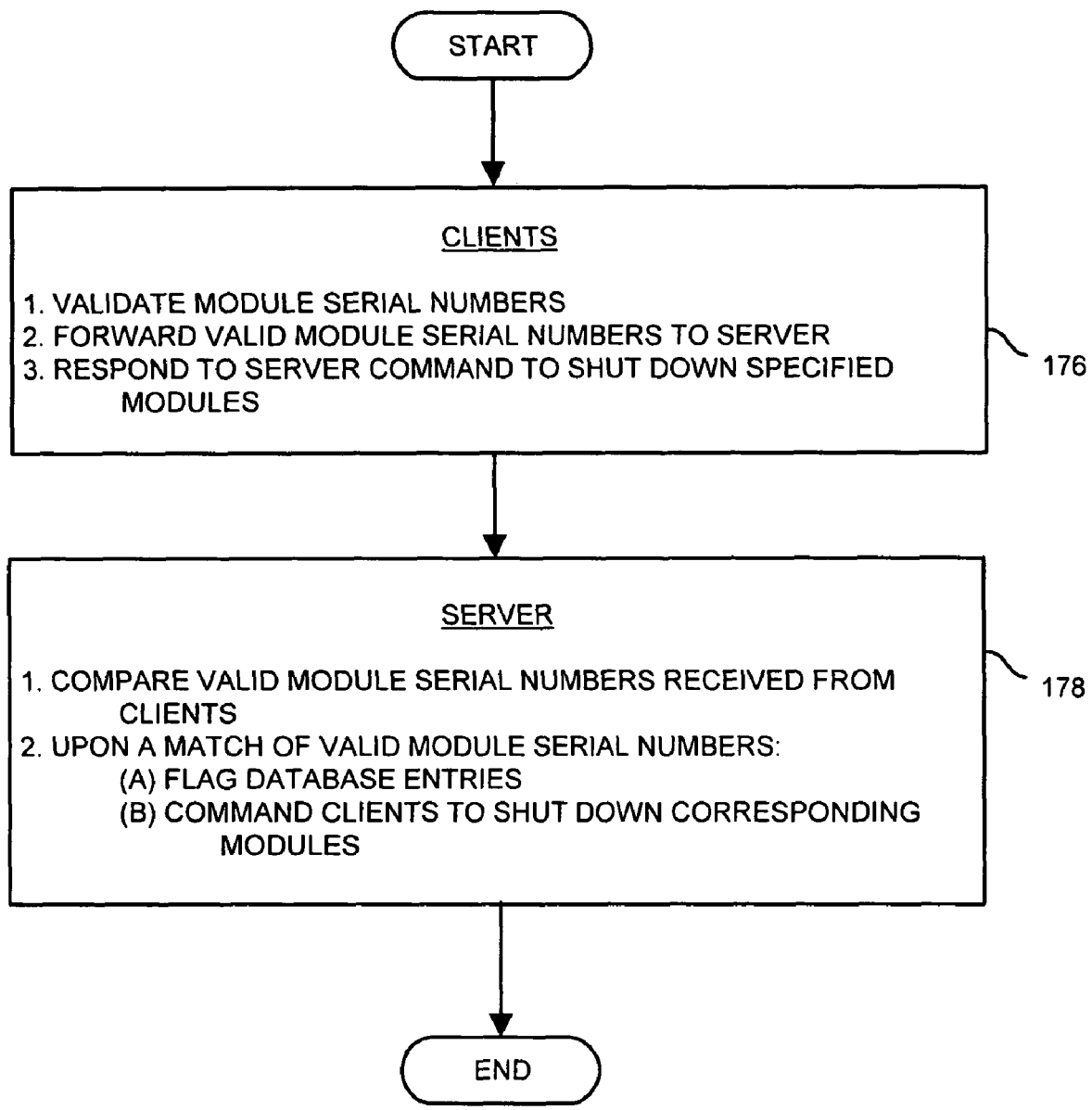
FIG. 12 is a flow diagram of a specific embodiment of the process of FIG. 11.

FIG. 12 illustrates a specific embodiment of the general process of FIG. 11. Step 176 is performed at each client device 140, while step 178 is performed within the server 151 that maintains the network module database 140. Each client device 140 does the following (step 176):

1. Validate module serial numbers

2. Forward valid module serial numbers to server

3. Respond to server command to shut down specified modules

Sub-step 3 above refers to the possibility that the server 151 might generate commands to shut down modules 24 upon detecting duplicate serial numbers as described below. In such a case, the client device 140 responds to such commands by shutting down the module(s) identified in the command from the server 151.

As shown in step 178, the server 151 does the following:

1. Compare valid module serial numbers received from clients

2. Upon a match of valid module serial numbers:
  a) Flag database entries
  b) Command clients to shut down corresponding modules Step 2(a) refers to setting a "flag" or indicator for those entries 152 (FIG. 9) having duplicated module serial numbers 158.

Figure 13:
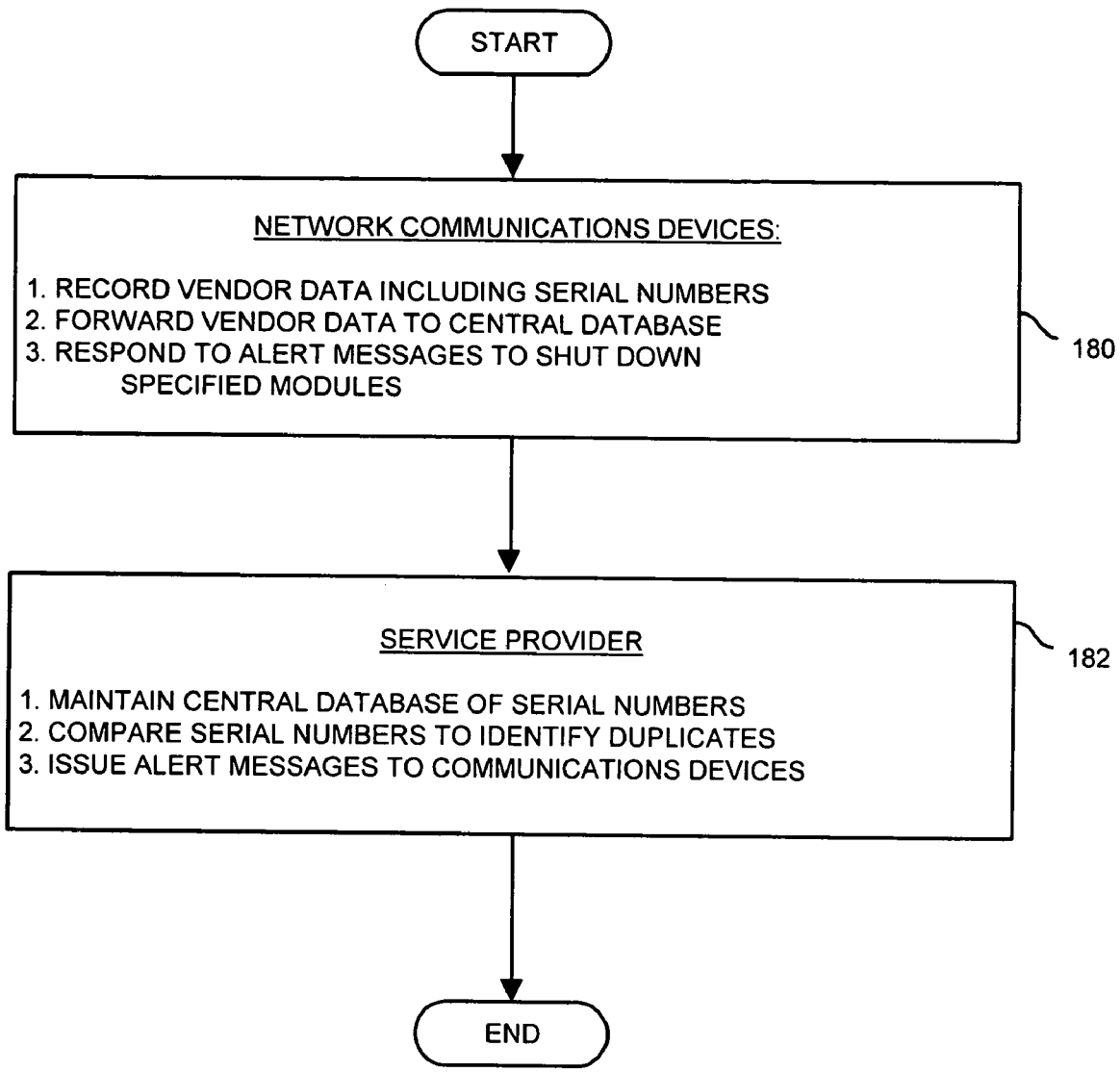
FIG. 13 is a flow diagram of a process for identifying duplicate module serial numbers in an alternative configuration employing a central service provider maintaining a central module database.

FIG. 13 illustrates a process similar to that of FIG. 12 but having a different (potentially broader) scope. A central database similar to the network module database 150 is maintained by a service provider, which may be for example the manufacturer/vendor of the network communications devices 140 (the terms "manufacturer" and "vendor" being intended to include both actual an manufacturer/vendor as well as agent(s) thereof). As shown in step 180, the devices 140 record the vendor data obtained from the modules 24 and forward the vendor data to the central database. The network communications devices 140 may also receive and respond to alert messages from the service provider, for example alert messages indicating that certain identified modules are employing duplicate serial numbers. The specific response to such alert messages may vary in different embodiments. Each device 140 may maintain a list of any serial numbers identified in the alert messages and compare the serial numbers of local modules to those on the list. Further action may depend on local policies. For example, a device 140 might automatically shut down a module having a serial number found to match a serial number on the list. Alternatively, the device 140 may simply notify a local system administrator, who can then take independent action. As a further alternative, the alert message itself might include an explicit or implicit command to shut down any modules that have a matching serial number, and the device 140 would respond accordingly.

As shown at step 182, the service provider maintains the central database which includes all module serial numbers included in vendor data forwarded to the service provider by the devices 140. The service provider performs a systematic comparison of module serial numbers to identify any duplicates, which may occur for examples across different devices 140 that are not part of a single network such as network 142 (FIG. 7). When any such duplicates are found, the service provider can take appropriate action which may include logging the duplicate serial numbers and issuing alert messages to the devices 140 to notify them of the duplicated serial numbers, such as described above. The alert messages can be generated system-wide, i.e., to all devices 140 known to the service provider. Such wide-scale communication can be an effective tool against counterfeiting of modules 24.

The functionality of FIG. 13 may be implemented in a variety of ways. In one embodiment, the devices 140 may have the capability to establish communications with the service provider for purposes of receiving software updates, for example, or for reporting diagnostic information. As an example, certain network communications devices sold by Cisco Systems include a so-called "call home" feature by which the devices can establish such communications with Cisco as an on-going provider of updates and other services for the network communications devices. The communication of vendor/module data shown in FIG. 13 may be included as part of such "call home" or similar functionality. The information in the central database can be used to log duplicate/counterfeit modules, and this information might be used for alerts as described above and to facilitate tracing of the source of such modules.

Alternatively, the communication of vendor/module information from the network communications devices 140 to the central database may be accomplished as part of a maintenance or repair procedure performed by the equipment manufacturer (actual manufacturer or an agent thereof). The network communications devices 140 may maintain the vendor and module information in local non-volatile memory, and the contents of the memory can be copied to the central database as part of the maintenance/repair procedure. This process might occur, for example, when a circuit board such as circuit board 20 is returned to the service provider for maintenance/repair.

As described above, embodiments of the invention are directed to techniques for verifying that a module is from an approved vendor based on a code from the module. When the module is installed on an electronic device, the electronic device can generate a valid signal if the code is proper, or an invalid signal if the code is improper. Accordingly, device operation can be controlled based on whether the device uses or does not use modules from an approved vendor. For example, the electronic device can disable the module if the code is improper (i.e., if the electronic device determines that the module is not from an approved vendor). The features of the invention, as described above, may be employed in electronic systems, devices and procedures, as well as other computer-related components such as those of Cisco Systems, Inc. of San Jose, Calif.

The above-described computerized device (circuit board 20) is described as a data communications device by way of example only. The computerized device can be other types of devices as well such as part of a general purpose computer, a specialized computer, an electronic device that operates in accordance with application specific integrated circuits (ASICs) or field programmable gate arrays (FPGAs), analog circuitry, combinations thereof, and the like.

Additionally, it should be understood that the modules 24 are described as being GBICs (e.g., high speed bi-directional optics modules) by way of example only. The modules 24 can be other types of devices as well, e.g., other types of small form factor pluggable components, communication transceiver modules or other types of network modules, memory modules, ASICs, FPGAs, circuit boards, etc.

Furthermore, it should be understood that the circuit board 20 is described as having multiple modules 24 by way of example only. In other arrangements, the circuit board 20 may include a single module 24 and be capable of determining whether that module 24 is from an approved vendor.

Additionally, it should be understood that the results of the authentication process (see the procedure 90 of FIG. 4) can be stored and later accessed by a technician. For example, authentication results can be taken and stored in a log file when the circuit board 20 is initially configured (e.g., when shipped from the factory). Additional results can then be logged if the configuration later changes, e.g., in response to the customer later installing off-the-shelf modules 24. The technician can then refer to the log file when attempting to trouble shoot or service the circuit board 20.

Furthermore, it should be understood that the computerized device is described as residing on a circuit board 20 by way of example only. The computerized device can have other configuration and topologies as well such as residing on multiple circuit boards, multi-chip modules (MCMs), multiple circuit boards through one or more interconnects (e.g., backplanes), etc. Such modifications and enhancements are intended to be part of embodiments of the invention, and the invention should be limited only by the spirit and scope of the claims.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a system having a plurality of network communications devices, each network communications device including a plurality of hardware modules, a method for verifying that the hardware modules are from an approved vendor, comprising:

i) at each network communications device, determining whether respective vendor data obtained from each hardware module of the network communications device is valid vendor data according to a vendor data checking procedure, wherein valid vendor data includes a valid vendor identifier and a valid module serial number; and ii) engaging in a counterfeit module detection process among the network communications devices, the counterfeit module detection process including (a) comparing respective valid module serial numbers from respective hardware modules of different ones of the network communications devices to identify duplicate valid module serial numbers among the network communications devices, each duplicate valid module serial number indicating that corresponding hardware modules from the different network communications devices are potentially counterfeit hardware modules not from an approved vendor, and (b) disabling operation of the potentially counterfeit hardware modules on each of the different network communications devices, wherein:

(a) each of the network communications devices maintains a respective device module database containing vendor data obtained from hardware modules of the network communications device;

(b) the system includes a service provider maintaining a central database containing vendor data for hardware modules of the network communications devices of the system, the network module database being populated with vendor data received from the device module databases of the network communications devices;

(c) comparing respective valid module serial numbers from respective hardware modules of different ones of the network communications devices includes comparing valid module serial numbers stored in the central database;

(d) the service provider is operative to generate alert messages to the network communications devices upon identifying duplicate valid module serial numbers, the alert messages inducing the disabling of the potentially counterfeit hardware modules; and (e) each network communications device is operative in response to each alert message from the service provider to:

include a module serial number from the alert message in a list of module serial numbers maintained by the network communications device;

compare the serial numbers of hardware modules in the network communications device with the module serial numbers in the list; and upon finding a match between a serial number of a hardware module in the network communications device with a module serial number in the list, take an action with respect to the hardware module having the matching serial number, the action selected from (i) shutting down the hardware module and (ii) notifying a local system administrator.

2. A method according to claim 1, wherein the vendor data from the device module databases is communicated to the service provider via a call-in type of communications session initiated by the network computerized devices.

3. A method according to claim 2, wherein the service provider is a manufacturer of the network communications devices.

4. A method according to claim 1, wherein the vendor data from the device module databases is stored in non-volatile memory on the respective network communications devices and transferred to the service provider as part of respective maintenance operations performed on the network communications devices by the service provider.

5. A method according to claim 1, wherein the vendor data checking procedure comprises:
obtaining vendor data and a first magic code from a hardware module;
generating a second magic code based on the vendor data; and
comparing the first and second magic codes.

6. A method according to claim 5, wherein the step of generating the second magic code comprises performing a message-digest algorithm operation on the vendor data.

7. A method according to claim 6, wherein the hardware module is one of a small form pluggable module and a gigabit interface converter (GBIC) module having a non-volatile memory in which the vendor data is stored.

8. A system, comprising:
a plurality of network communications devices, each network communications device including a plurality of hardware modules that may or may not be from an approved vendor, each network communications device being operative to determine whether respective vendor data obtained from each hardware module of the network communications device is valid vendor data according to a vendor data checking procedure, wherein valid vendor data includes a valid vendor identifier and a valid module serial number; and
a system component operative to engage in a counterfeit module detection process among the network communications devices, the counterfeit module detection process including (a) comparing respective valid module serial numbers from respective hardware modules of different ones of the network communications devices to identify duplicate valid module serial numbers among the network communications devices, each duplicate valid module serial number indicating that the corresponding hardware modules from the different network communications devices are potentially counterfeit hardware modules not from an approved vendor, and (b) disabling operation of the potentially counterfeit hardware modules on each of the different network communications devices,
wherein:
(a) each of the network communications devices maintains a respective device module database containing vendor data obtained from hardware modules of the network communications device;
(b) the system component includes a service provider maintaining a central database containing vendor data for hardware modules of the network communications devices of the system, the network module database being populated with vendor data received from the device module databases of the network communications devices;
(c) the comparing of respective valid module serial numbers from respective hardware modules of different ones of the network communications devices includes comparing valid module serial numbers stored in the central database;
(d) the service provider is operative to generate alert messages to the network communications devices upon identifying duplicate valid module serial numbers, the alert messages inducing the disabling of the potentially counterfeit hardware modules; and
(e) each network communications device is operative in response to each alert message from the service provider to:
include a module serial number from the alert message in a list of module serial numbers maintained by the network communications device;
compare the serial numbers of hardware modules in the network communications device with the module serial numbers in the list; and
upon finding a match between a serial number of a hardware module in the network communications device with a module serial number in the list, take an action with respect to the hardware module having the matching serial number, the action selected from (i) shutting down the hardware module and (ii) notifying a local system administrator.

9. A system according to claim 8, wherein the vendor data from the device module databases is communicated to the service provider via a call-in type of communications session initiated by the network computerized devices.

10. A system according to claim 9, wherein the service provider is a manufacturer of the network communications devices.

11. A system according to claim 8, wherein the vendor data from the device module databases is stored in non-volatile memory on the respective network communications devices and transferred to the service provider as part of respective maintenance operations performed on the network communications devices by the service provider.

12. A system according to claim 8, wherein the network communications device is operative when performing the vendor data checking procedure to:
obtain vendor data and a first magic code from a hardware module;
generate a second magic code based on the vendor data; and
compare the first and second magic codes.

13. A system according to claim 12, wherein the network communications device is operative when generating the second magic code to perform a message-digest algorithm operation on the vendor data.

14. A system according to claim 13, wherein the hardware module is one of a small form pluggable module and a gigabit interface converter (GBIC) module having a non-volatile memory in which the vendor data is stored.

15. A network communications device, comprising:
a plurality of hardware modules that each may or may not be from an approved vendor; and
a controller operative to:
i) determine whether respective vendor data obtained from each hardware module of the network communications device is valid vendor data according to a vendor data checking procedure, wherein valid vendor data includes a valid vendor identifier and a valid module serial number; and ii) engage in a counterfeit module detection process among the network communications devices, the counterfeit module detection process including (a) providing the valid module serial number to a system component that is operative to compare the valid module serial number with respective valid module serial numbers of other network communications devices to identify duplicate valid module serial numbers, each duplicate valid module serial number indicating that the hardware modules from the different network communications devices are potentially counterfeit hardware modules not from an approved vendor, and (b) disable operation of the potentially counterfeit hardware modules on the network communications device, wherein:

(a) the network communications device maintains a device module database containing vendor data obtained from hardware modules of the network communications device;

(b) the system component includes a service provider maintaining a central database containing vendor data for hardware modules of the network communications devices, the network module database being populated with vendor data received from the device module databases of the network communications devices;

(c) the service provider is operative to compare respective valid module serial numbers from respective hardware modules of different ones of the network communications devices includes comparing valid module serial numbers stored in the central database;

(d) the service provider is operative to generate alert messages to the network communications device upon identifying duplicate valid module serial numbers, the alert messages inducing the disabling of the potentially counterfeit hardware modules by the network communications device; and (e) the network communications device is operative in response to each alert message from the service provider to:

include a module serial number from the alert message in a list of module serial numbers maintained by the network communications device;

compare the serial numbers of hardware modules in the network communications device with the module serial numbers in the list; and upon finding a match between a serial number of a hardware module in the network communications device with a module serial number in the list, take an action with respect to the hardware module having the matching serial number, the action selected from (i) shutting down the hardware module and (ii) notifying a local system administrator.

16. A network communications device according to claim 15, wherein the vendor data from the device module databases is communicated to the service provider via a call-in type of communications session initiated by the network computerized device.

17. A network communications device according to claim 16, wherein the service provider is a manufacturer of the network communications devices.

18. A network communications device according to claim 15, wherein the vendor data from the device module databases is stored in non-volatile memory on the respective network communications devices and transferred to the service provider as part of respective maintenance operations performed on the network communications devices by the service provider.

19. A network communications device according to claim 15, wherein the network communications device is operative when performing the vendor data checking procedure to:

obtain vendor data and a first magic code from a hardware module;

generate a second magic code based on the vendor data; and compare the first and second magic codes.

20. A network communications device according to claim 19, wherein the network communications device is operative when generating the second magic code to perform a message-digest algorithm operation on the vendor data.

21. A network communications device according to claim 20, wherein the hardware module is one of a small form pluggable module and a gigabit interface converter (GBIC) module having a non-volatile memory in which the vendor data is stored.

* * * * *